United States Patent
Eriksson et al.

(10) Patent No.: US 6,724,610 B1
(45) Date of Patent: Apr. 20, 2004

(54) CAPACITOR ELEMENT FOR A POWER CAPACITOR AND ALSO A POWER CAPACITOR COMPRISING SUCH A CAPACITOR ELEMENT

(75) Inventors: Esbjörn Eriksson, Rönninge (SE); Bo Stenerhag, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/398,459

(22) PCT Filed: Oct. 4, 2001

(86) PCT No.: PCT/SE01/02147

§ 371 (c)(1),
(2), (4) Date: Jul. 28, 2003

(87) PCT Pub. No.: WO02/29835

PCT Pub. Date: Apr. 11, 2002

(30) Foreign Application Priority Data

Apr. 10, 2000 (SE) ................................................ 0003565

(51) Int. Cl.$^7$ ............................................... H01G 4/005
(52) U.S. Cl. ..................... 361/303; 361/305; 361/307; 361/313; 361/273; 361/314
(58) Field of Search ................................. 361/303, 305, 361/307, 313, 273, 275, 314, 323, 304, 315, 324, 301.4, 301.5, 328

(56) References Cited

U.S. PATENT DOCUMENTS

| | | | |
|---|---|---|---|
| 2,528,596 A | | 11/1950 | Liechti |
| 4,320,437 A | | 3/1982 | Shaw et al. |
| 4,464,700 A | * | 8/1984 | Stenerhag et al. .......... 361/307 |
| 4,633,369 A | * | 12/1986 | Lapp et al. ................. 361/328 |
| 5,310,699 A | * | 5/1994 | Chikawa et al. ............ 438/614 |
| 5,563,763 A | * | 10/1996 | Johansson et al. ........ 361/301.4 |
| 2003/0090854 A1 | * | 5/2003 | Eriksson et al. ............ 361/303 |
| 2003/0117763 A1 | * | 6/2003 | Connolly ................. 361/301.5 |

* cited by examiner

Primary Examiner—Dean A. Reichard
Assistant Examiner—Nguyen T. Ha
(74) Attorney, Agent, or Firm—Swidler Berlin Shereff Friedman, LLP

(57) ABSTRACT

A capacitor element for a power capacitor having a two foils (3, 5) of metal forming a pair of electrodes, and also films (2a, 2b, 4a, 4b) of dielectric material forming the dielectric medium of the capacitor element. The capacitor element is produced by the foils and films being arranged one on top of the other and wound to a roll, so that the capacitor element displays a first end surface where one of the foils (5) has a long edge (10) indented between two of the films (2a, 4b), and also a second end surface where the other foil (3) has a long edge (9) indented between two of the films (2b, 4a), each of which indented long edges has an edge portion (15; 16) surrounded by an elongate field equalizer (18; 19) of dielectric material surrounding the edge portion. In accordance with the invention the field equalizer (18; 19) is in the form of an elongate strip having a thickness within the interval 5–10 μm which is folded around the indented long edge (9; 10) and surrounds the latter and which extends axially through the capacitor element (1).

9 Claims, 2 Drawing Sheets

CAPACITOR ELEMENT FOR A POWER CAPACITOR AND ALSO A POWER CAPACITOR COMPRISING SUCH A CAPACITOR ELEMENT

TECHNICAL FIELD

The present invention relates to a capacitor element for a power capacitor comprising a first foil of metal material and a second foil of metal material arranged to form a pair of electrodes, and also films of dielectric material arranged between the foils in order to form a dielectric medium, which capacitor element is produced by said foils and films being arranged one on top of the other and wound to a roll, the capacitor element displaying a first end surface where the second foil has a long edge indented between two of said films situated adjacent to the second foil, and also a second end surface where the first foil has a long edge indented between two of said films situated adjacent to the first foil, each of which indented long edges has an edge portion surrounded by an elongate field equalizer of dielectric material surrounding the edge portion.

The invention also relates to a power capacitor comprising such a capacitor element.

In this context "power capacitor" refers to a capacitor for alternating or direct current applications for voltages exceeding 1 kV.

BACKGROUND ART

A capacitor element of the type mentioned above is often referred to as a wound or wrapped capacitor element of film-foil type. The films and foils are in the form of elongate, thin, substantially rectangular strips with parallel long edges. When manufacturing capacitor elements the films and foils are arranged one on top of the other and wound to said roll form, so that in its radial direction the capacitor displays several layers of foils with intermediate layers of films. The foils thus form the electrodes of the capacitor element and the films form the dielectric medium of the capacitor element. To prevent electric flashover between the electrodes at the end surfaces of the capacitor element one foil, the first, is displaced in axial direction of the capacitor element towards one end surface, the first, of the capacitor element, so that the first foil displays a long edge that is indented between the films at the second end surface of the capacitor element. Similarly, the second foil is displaced in axial direction of the capacitor element towards the second end surface of the capacitor element so that the second foil displays a long edge indented between the films at the first end surface of the capacitor element. Since a certain indentation is necessary to ensure electric insulation between the electrodes, the indentation entails a limitation of the area the electrodes connect capacitively to each other, which is not desirable.

When constructing a power capacitor a plurality of capacitor elements of the type described above are connected together in series and in parallel. The connected capacitor elements form a capacitor stack which is enclosed in a container and connected electrically by means of connection contacts which, with the aid of bushings, pass through the container. In order to save space it is usual for the roll-shaped capacitor elements to be flattened to non-circular cross-section before they are connected together. The capacitor elements are usually impregnated in the container with an impregnating agent, such as some form of oil.

During operation the electrodes in each capacitor element are placed under voltage, whereupon a voltage difference, termed "element voltage", is produced between the electrodes. Due to the element voltage an electric field is produced in the dielectric medium between the electrodes, having an electric field intensity that is substantially proportional to the element voltage and inversely proportional to the distance between the electrodes, i.e. to the thickness of the dielectric medium. A rated or average field intensity, $E_{mean}=U/d$ is calculated for each capacitor element, where U is the element voltage and d the thickness of the dielectric medium. This average field intensity gives an approximate value of the field intensity in the dielectric medium inside the indented long edges of the electrodes. As high an average field intensity as possible is aimed at in a capacitor element. For instance the reactive power produced by a capacitor element for alternating current applications is substantially proportional to the average field intensity squared. However, field concentrations occur at the indented long edges where the field intensity locally assumes values that greatly exceed the average field intensity. If steps are taken to increase the average field intensity, e.g. if the element voltage is increased, the field intensity at the indented long edges will also increase. If the average field intensity exceeds a critical limit value, so-called partial discharges will occur at the indented long edges of the foils, due to the field concentrations. Partial discharges, also termed glow discharges, are electrical discharges that break down the dielectric medium. In time partial discharges may cause penetration of the insulation in the electric medium, resulting in short-circuiting between the electrodes.

One way of reducing field concentrations at the long edges of a capacitor element is described in U.S. Pat. No. 2,528,596 A. The capacitor element is provided with narrow dielectric strips that are folded around the indented long edges for the purpose of increasing the thickness of the dielectric medium locally around these long edges, thereby improving the electrical strength.

Another way of reducing the field concentrations at the long edges of a capacitor element is described in U.S. Pat. No. 4,320,437 A where the electrode, either in its entirety or just its long edges, is coated with a dielectric material to form a very thin coating having considerable dielectric constant. The purpose of the coating is not to increase the thickness of the dielectric medium but to replace the impregnation liquid nearest the electrode. The dielectric constant of the coating shall be as great as or greater than the dielectric constant of the impregnation liquid. A number of coating techniques are mentioned, all of which are more or less technically complicated and produce an extremely thin coating. The preferred coating thickness is stated to be in the interval 0.12–0.25 $\mu$m, and a thickness exceeding 5 $\mu$m is said to be unusable.

Yet another known method of reducing field concentrations is to shape the indented long edges of the foils as gently as possible, i.e. with as few sharp edges as possible. It is known, for instance, to use foils with laser-cut long edges, so that rounded long edges, without sharp edges are obtained. It is also known to fold the indented long edges double, thereby giving long edges with gentle semi-circular shape. Despite these measures, for many power capacitor applications partial discharges at the indented long edges limit the average field intensity that can be permitted in a conventional capacitor element.

DESCRIPTION OF THE INVENTION

The object of the present invention is to provide a new capacitor element of the type described in the introduction, which effectively equalizes the increased electrical strength resulting from said field equalizers.

The capacitor element and the power capacitor in accordance with the invention are characterized in that the field equalizer is in the form of an elongate strip having a thickness within the interval 5–10 μm which is folded around the indented long edge and surrounds the latter and which extends axially through the capacitor element.

Thanks to their thickness and to the field equalizers surrounding the indented long edges and extending through the capacitor element, the field equalizers contribute not only to the electrical strength increasing at the indented long edges but also to the thickness of the dielectric medium increasing. The element voltage that can be connected between the electrodes is thus increased and fewer capacitor elements therefore need to be series-connected in a power capacitor in accordance with the invention in order to achieve a predetermined voltage over the connection contacts of the power capacitor. Since thicker dielectric medium means that the volume taken up in the capacitor element decreases and the volume taken up by the dielectric medium increases, the energy density in the capacitor element will also be higher. In one embodiment the field equalizers consist of the same dielectric material as the dielectric medium of the capacitor element. This offers the advantage of fewer types of material having to be used when manufacturing the capacitor element, and thus simpler handling at the manufacturing stage.

DESCRIPTION OF THE DRAWINGS

The invention will be described in more detail in the following with reference to the drawings.

DESCRIPTION OF EMBODIMENTS

Figure 1:
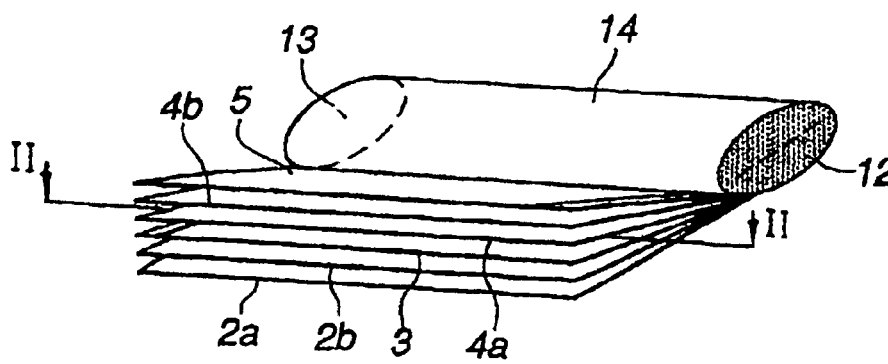
FIG. 1 shows a capacitor element in accordance with the invention, comprising films and foils, and a field equalizer in accordance with the invention.
Figure 2:
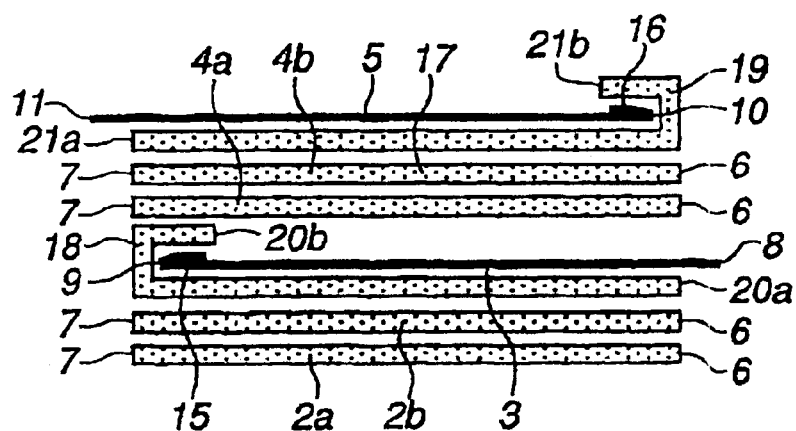
FIG. 2 shows a cross section through a capacitor element as in FIG. 1, along the line marked II—II.

FIG. 1 shows a capacitor element 1 comprising two first films 2a, 2b of dielectric material, a first foil 3 of metal material, two second films 4a, 4b of dielectric material and a second foil 5 of metal material. FIG. 2 shows the capacitor element 1 in a section along the line II—II in FIG. 1. The films 2a, 2b , 4a, 4b are strip-shaped, i.e. elongated, each having a first long edge 6 and a second long edge 7 substantially parallel thereto. The foils 3, 5, like the films. 2a, 2b, 4a, 4b, are also strip-shaped and have corresponding long edges 8, 9; 10, 11. The films 2a, 2b, 4a, 4b and foils 3, 5 are arranged one on top of the other and wound to a roll, as can be seen in FIG. 1, where the capacitor element 1 is shown partially unrolled for the sake of clarity. The capacitor element 1 thus displays a first end surface 12, a second end surface 13 and an envelope surface 14 joining the end surfaces 12, 13. During the winding operation the second foil 5 is in contact with the film 2a and in radial direction the capacitor element 1 thus displays repeated layers of the first and second foils 3, 5 with intermediate layers of the first and second films 2a, 2b, 4a, 4b. The foils 3, 5 thus form a pair of electrodes in the capacitor element 1 and consist of a metal material suitable for this purpose, preferably aluminium. The films 2a, 2b, 4a, 4b form the dielectric medium of the capacitor element 1 and consist of a dielectric material suitable for this purpose, preferably polypropene. As can be seen in FIG. 2 the first long edges 6 of the films 2a, 2b, 4a, 4b, like their second long edges 7, are arranged immediately above each other in the radial direction of the capacitor element 1. The first foil 3 is displaced in axial direction of the capacitor element 1 towards the first end surface 12 of the capacitor element 1, so that the first long edge 8 of the first foil 3 protrudes at the first end surface 12 between the first long edges 6 of the films 2b and 4a. At the second end surface 13 the second long edge 9 of the first foil 3 is indented between the second long edges 7 of the films 2b and 4a. Similarly, the second foil 5 is displaced in axial direction of the capacitor element 1 towards the second end surface 13 of the capacitor element 1, where the second long edge 11 of the second foil 5 protrudes between the second long edges 7 of the films 4b and 2a. At the first end surface 12 the first long edge 10 of the second foil 5 is indented between the first long edges 6 of the films 4b and 2a. The protruding long edge 8 of the first foil 3 forms the electrical connection point of the first electrode 3 at the first end surface 12 of the roll, and the protruding long edge 11 of the second foil 5 forms the electrical connection point of the second electrode 5 at the second end surface 13 of the roll. The films 2a, 2b, 4a, 4b preferably have the same dimensions. The width of the films 2a, 2b, 4a, 4b is preferably within the interval 200–400 millimeter (mm) and their thickness within the interval 8–15 micrometer (μm). In the present example, therefore, the thickness of the dielectric medium is in the interval 16–30 μm. The first foil 3 preferably has the same dimensions as the second foil 5, and the foils 3, 5 are preferably somewhat wider than the films 2a, 2b, 4a, 4b. The thickness of the foils 3, 5 is preferably in the interval 4–6μm.

At the indented long edges 9; 10 each foil 3; 5 has an edge portion 15; 16 that, in accordance with the invention, is surrounded by an elongate field equalizer 18; 19 (see FIG. 2) of dielectric material arranged between the edge portion 15; 16 and the films 2b, 4a; 4b, 2a situated adjacent to the edge portion 15; 16. The field equalizers 18, 19 are in the form of thin, elongate strips 18, 19 folded around respective indented long edge 9; 10 and surrounding the latter. Each strip 18; 19 has a first long edge 20a; 21a and a second long edge 20b; 21b arranged one on each side of the foil 3; 5. Each strip 18; 19 has a width that permits it to extend axially through the capacitor element 1 on one side of the foil 3; 5, so that the main part of the strip 18; 19 contributes to the dielectric medium of the capacitor element 1. The strip 18; 19 is thus so arranged that one of its long edges 20a; 21a is on a level with the long edges 7; 6 at the protruding long edge 8; 11 of the foil 3; 5. The other long edge 20b; 21b of the strip 18; 19 is arranged a distance from the indented long edge 9; 10 of the foil 3; 5 that is equal to the thickness of the foil 3; 5 multiplied by a factor in the interval 500–3000. Simulations and experiments indicate that a strip 18; 19 having such width effectively equalizes field concentrations at the indented long edge 9; 10, which field concentrations would otherwise give rise to partial discharges. For a capacitor element 1 where the thickness of the foil 3; 5 lies within the interval 4–6 μm, which is normal, this would mean that the width of the edge portion would lie in the interval 2–24 mm.

To ensure good field equalizing effect it is important for the strips 18, 19, described above to be so arranged at the edge portions 15, 16 that no air pockets exist between the strips 18, 19 and respective edge portions 15; 16. This is particularly important at the indented long edges 9, 10 where the field concentrations are normally greatest. The strips 18, 19 preferably abut the foils 3, 5, i.e. the strips 18, 19 are preferably arranged in contact with the foils 3, 5. The thickness of the strips 18, 19 is preferably within the interval 5–10 μm. The strips 18, 19 may consist of the same dielectric material as the films 2a, 2b, 4a, 4b, which is usually polypropene. However, since the strips 18, 19 only take up a limited portion of the volume of the capacitor element 1, other dielectric materials having satisfactory resistance to partial discharges, but which are relatively expensive, may also be used. Material having relatively high dielectric constant, for instance in the interval 2–12, may also advantageously be used since such material contributes to a particularly great extent to an equalization of the electric field. An example of such a material is polyester. The strips 18, 19 are preferably arranged at the edge portions 15, 16 in conjunction with the winding operation mentioned above, i.e. when the foils 3, 5 and films 2a, 2b, 4a, 4b are combined and wound to said cylindrical shape. Thanks to the extra electrical insulation contributed by the strips 18, 19 the indentation of the indented long edges 9, 10 can be made less than in known conventional capacitor elements. In the embodiments shown the indentation is preferably within the interval 3–10 mm.

Figure 3:
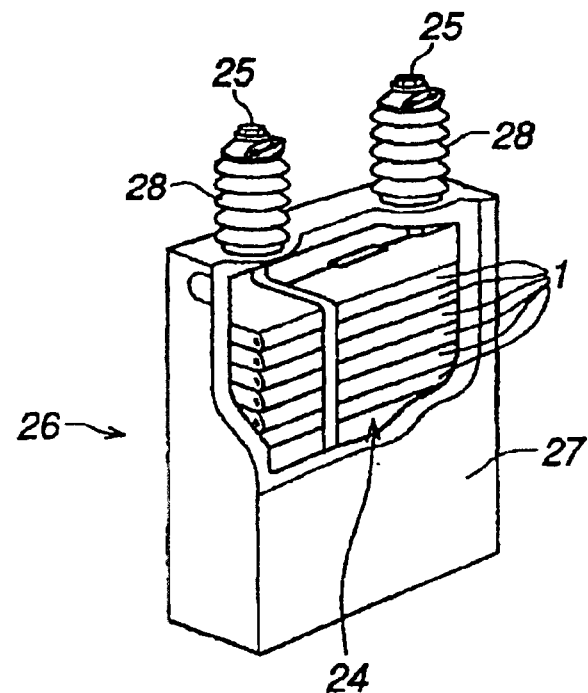
FIG. 3 shows a power capacitor in accordance with the invention, comprising a plurality of capacitor elements with field equalizers.
Figure 4:
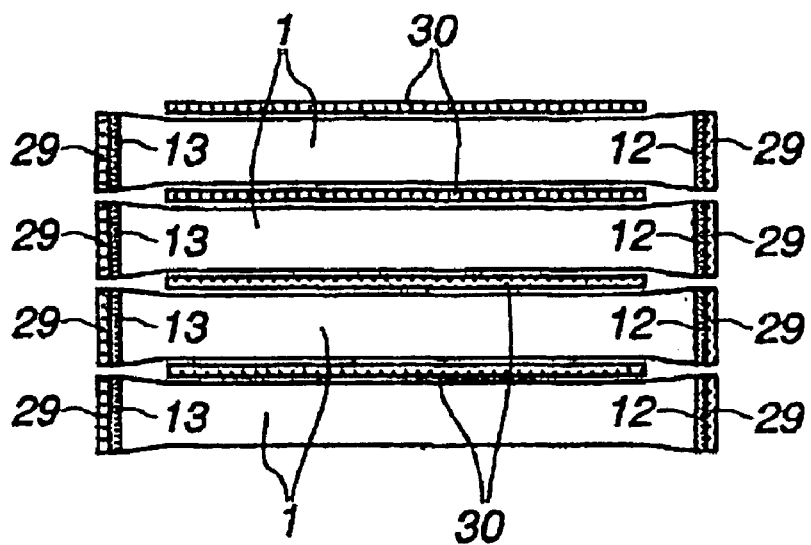
FIG. 4 shows an enlarged partial view of four capacitor elements as shown in FIG. 3.

FIG. 3 shows a power capacitor 26 in accordance with the invention, in which a plurality of capacitor elements 1 comprising one of the field equalizers described above, are connected together in known manner. The assembled capacitor elements 1 form a capacitor stack 24 which is enclosed in a container 27. The capacitor stack 24 can be connected electrically with the aid of connection contacts 25 which, with the aid of bushings 28, are passed through the container 27. The power capacitor 26 is preferably impregnated in known manner with an impregnating agent, such as some form of oil. FIG. 4 shows an enlarged partial view of the capacitor stack 24 illustrated in FIG. 3, where four capacitor elements 1 are visible. Contacts 29 in the form of flame-sprayed aluminium are arranged at the end surfaces 12, 13 of the capacitor elements 1, for electrical connection to the electrodes (not shown) protruding at the end surfaces. During operation each capacitor element 1 is compressed in radial direction due to electrostatic forces between the electrodes. In the area inside the edge portions 15, 16 of the electrodes (see FIG. 2) the distance between the electrodes is substantially defined by the thickness of the dielectric medium, i.e. the films 2a, 2b, 4a, 4b, while the distance between the electrodes, i.e. the foils 3, 5 in an inner area 17 between the edge portions 15, 16 is defined by the total thickness of the films 2a, 2b, 4a, 4b and the field equalizers 18, 19. The distance between the first foil 3 and the second foil 5 is thus greater at the edge portions 15, 16 than in the inner area 17 between the edge portions 15, 16. Consequently, as can be seen in FIG. 4, the capacitor element 1 displays an hourglass shape in the axial direction, i.e. each capacitor element 1 has a waist. In order to compensate for the hourglass shape filler elements 30 are preferably arranged between the capacitor elements 1 to absorb compressive forces between the capacitor elements 1. The filler elements 30 provide the capacitor stack with mechanical stability and also permit better control of the pressure distribution between the various parts of the capacitor elements 1. The filler elements 30 are preferably made of pressboard or some other electrically insulating material.

Figure 5:
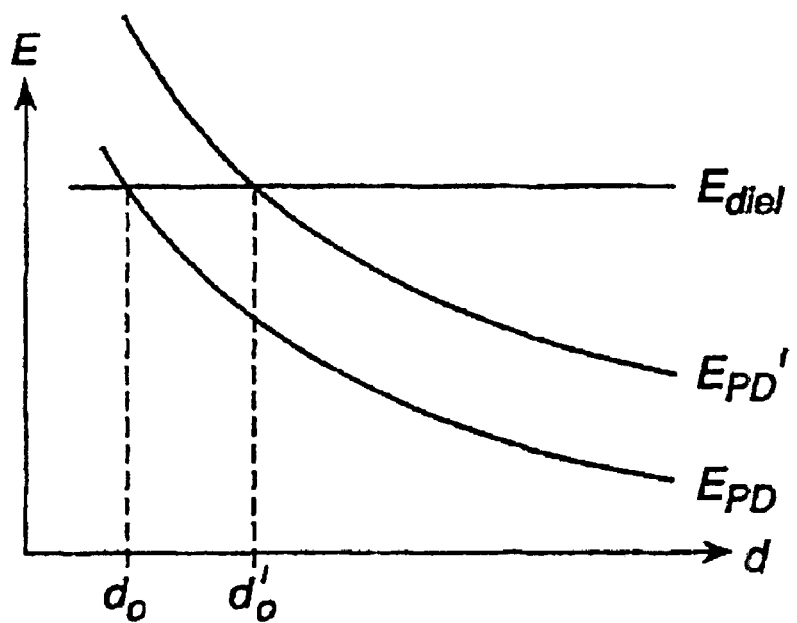
FIG. 5 is a diagram illustrating how a field equalizer influences the electric field intensity in a capacitor element.

FIG. 5 shows a diagram illustrating how the invention affects the electrical field intensity in a capacitor element. The diagram shows limiting curves for the average field intensity measured or calculated in the capacitor element. As stated previously, the average field intensity is defined as $E_{mean}=U/d$, where U is the element voltage of the capacitor element and d is the thickness of the dielectric medium. The electrical strength of the dielectric medium sets a maximum possible upper limit for the field intensity between the electrodes. If this limit is exceeded electric punctures will occur in the dielectric medium and the electrodes will be short-circuited. The electrical strength of the dielectric medium is a material parameter that is substantially independent of the thickness of the dielectric medium. In FIG. 5 the electrical strength of the dielectric medium is illustrated by the linear, horizontal curve $E_{diel}$. Thus, for average field intensities exceeding the electrical strength of the dielectric medium, i.e. for $E_{mean}<E_{diel}$, electric punctures occur in the dielectric medium. Another limiting fact, as described earlier, is field concentrations at the indented long edges of the electrodes. This is illustrated by the curve $E_{PD}$ in FIG. 5 for a capacitor element that lacks field equalizers in accordance with the invention. For average field intensities $E_{mean}<E_{PD}$ the field concentrations gives rise to partial discharges at the indented long edges. Unlike $E_{diel}$, $E_{PD}$ diminishes non-linearly with increasing thickness of the dielectric medium. As can be seen in the diagram $E_{diel}=E_{PD}$ when $d=d_0$, which means that the electrical strength of the dielectric medium is the dimensioning factor for capacitor elements with dielectric media thinner than do, and partial discharges at the indented long edges is the dimensioning factor for capacitor elements with dielectric media thicker than $d_0$. To load the capacitor element with the highest possible average field intensity, i.e. $E_{mean}=E_{diel}$, therefore, the thickness of the dielectric medium is limited to $d_0$. A thicker dielectric medium may be used but in that case a lower average field intensity, i.e. $E_{mean}=E_{PD}$, must be accepted. By arranging the field equalizers at the indented long edges, however, the electric field at the indented long edges is equalized, i.e. the local value for the field intensity in the field concentrations is reduced. A higher average field intensity can thus be permitted before partial discharges occur at the indented long edges. This is illustrated by the curve $E_{PD}'$ in FIG. 5. While maintaining maximum average field intensity, i.e. $E_{mean}=E_{diel}$, therefore, the thickness of the dielectric medium can be increased to $d_0'$ without partial discharges occurring at the indented long edges. The element voltage U that can be connected between the electrodes is thus increased from $U=E_{diel} \cdot d_0$ to $U=E_{diel} \cdot d_0'$, which means that fewer capacitor elements need to be connected in series in a power capacitor to achieve a predetermined voltage over the connecting contacts of the power capacitor. Also, since thicker dielectric medium means that the volume taken up by the electrodes in the capacitor element decreases and the volume taken up by the dielectric medium increases, the energy density in the capacitor element will be higher.

The invention has been described above from a specific embodiment of a capacitor element of film-foil type. However, it will be understood that the invention is also applicable to other embodiments of capacitor elements having electrodes in the form of foils with indented long edges where there is a risk of field concentrations causing partial discharges. It will also be understood that the field equalizers described above can be advantageously combined with field equalizing measures known per se, such as laser-cutting the long edges of the electrodes or folding the long edges double.

What is claimed is:
1. A capacitor element (1) for a power capacitor comprising a first foil (3) of metal material and a second foil (5) of metal material arranged to form a pair of electrodes, and also film (2a, 2b, 4a, 4b) of dielectric material arranged between the foils (3, 5) in order to form a dielectric medium, which capacitor element (1) is produced by said foils (3, 5) and films (2a, 2b, 4a, 4b) being arranged one on top of the other and wound to a roll, the capacitor element (1) displaying a first end surface (12) where the second foil (5) has a long edge (10) indented between two of said films (2a, 4b) situated adjacent to the second foil (5), and also a second and surface (13) where the first foil (3) has a long edge (9) indented between two of said films (2b, 4a) situated adjacent to the first foil (3), each of which indented long edge (9, 10) has an edge portion (15; 16) surrounded by an elongate field equalizer (18; 19) of dielectric material surrounding the edge portion (15, 16), characterized in that the field equalizer (18, 19) is in the form of an elongate strip having a thickness within the interval 5–10 μm which is folded around the indented long edge (9, 10) and surrounds the latter and which extends axially though the capacitor element (1).

2. A capacitor element (1) as claimed in claim 1, characterized in that one long edge (20a; 21a) of the strip (18; 19) is arranged at the protruding edge (8; 11) of the foil (3; 5) on a level with the long edge (7; 6) of the film, and the other long edge (20b; 21b) is arranged at a distance from the indented long edge (9; 10) that in equal to the thickness of the foil (3; 5) multiplied by a factor in the interval 500–3000.

3. A capacitor element (1) as claimed in claim 1, characterized in that the field equalizer (18, 19) is arranged in contract with the foil (1,5).

4. A capacitor element (1) as claimed in claim 1, characterized in that the field equalizer (18, 19) has a dielectric constant in the interval 2–12.

5. A capacitor element (1) as claimed in claim 1, characterized in that the field equalizer (16; 19) is made polyester.

6. A power capacitor (28) comprising a plurality of capacitor elements (3) comprising a first foil (3) of metal material and a second foil (5) of metal material arranged to form a pair of electrodes, and also films (2a, 2b, 4a, 4b) of dielectrodes material arranged between the foils (3, 5) in order to form a dielectric medium, which capacitor element (1) is produced by said foils (3, 5) and films (2a, 2b, 4a, 4b) being arranged one on top of the other and around to a roll, the capacitor element (1) displaying a first and surface (12) where the second foil (5) has a long edge (10) indented between two of said films (2b, 4a) situated adjacent to the second foil (5) and also a second and surface (13) where the first foil (3) has a long edge (5) indented between two of said films (2b, 4a) situated adjacent to the first foil (3). Each of which indented long edges (9; 10) has an edge portion (15; 16), surrounded by an alongate field equalizer (18; 19) of dielectric material surrounding the edge portion (15; 16), characterized in that the field equalizer (18; 19) is in the form of an alongate strip having a thickness within the interval 5–10 μm which is folded around the indented long edge (9; 10) and surrounds the same and which extended axially through the capacitor element (1).

7. A power capacitor (25) as claimed in claim 6, characterized in that one long edge (20a, 21a) of the strip (18, 19) is arranged at the protruding edge (8; 11) of the foil (3; 5) on a level with the long edges (7; 8) of the films, and the other long edge (20b; 21b) in arranged at a distance from the indented long edge (9, 10) that is equal to the thickness of the foil (3, 5) multiplied by a factor in the interval 500–3000.

8. A power capacitor (26) as claimed in claim 6, characterized in that the capacitor element (1) is large glass-shaped in the axial direction and in that filler elements (30) are arranged between the capacitor elements (1) to attach compressive force between force between the capacitor elements (1).

9. A power capacitor (26) as claimed in claim 8, characterized in that the filler element (30) consists of pressboard.

* * * * *